United States Patent [19]
Blaurock et al.

[11] 4,312,545
[45] Jan. 26, 1982

[54] TORQUE TRANSMITTING BEARING ASSEMBLY

[75] Inventors: Günter Blaurock, Niederwerrn; Ernst Albert, Sand; Klaus Reichert, Kissingen-Garitz; Rudolf Schlereth, Frauenroth, all of Fed. Rep. of Germany

[73] Assignee: Deutsche Star Kugelhalter GmbH, Schweinfurt, Fed. Rep. of Germany

[21] Appl. No.: 207,427

[22] Filed: Nov. 17, 1980

Related U.S. Application Data

[63] Continuation of Ser. No. 88,822, Oct. 26, 1979, abandoned.

[30] Foreign Application Priority Data

Nov. 16, 1978 [DE] Fed. Rep. of Germany ....... 2849758

[51] Int. Cl.$^3$ ............................................. F16C 29/06
[52] U.S. Cl. .................................... 308/6 C; 308/6 A
[58] Field of Search ............. 308/6 C, 6 B, 6 A, 6 R, 308/201; 64/23.7

[56] References Cited
U.S. PATENT DOCUMENTS

| | | |
|---|---|---|
| 2,620,163 | 12/1952 | Stone . |
| 2,945,366 | 7/1960 | Sears ................................ 64/23.7 |
| 3,808,839 | 5/1974 | Teramachi ........................ 308/6 C |
| 3,884,537 | 5/1975 | McCloskey ...................... 308/6 C |
| 4,127,309 | 11/1978 | Teramachi ........................ 64/23.7 |
| 4,201,424 | 5/1980 | Ernst et al. ....................... 64/23.7 |

FOREIGN PATENT DOCUMENTS

1902522 10/1969 Fed. Rep. of Germany .
2435916 2/1976 Fed. Rep. of Germany .

OTHER PUBLICATIONS

Thompson Industries Brochure, "Ball–Groove Shaft and 'Super' Ball Bushing", 1975.

*Primary Examiner*—Lenard A. Footland
*Attorney, Agent, or Firm*—Toren, McGeady and Stanger

[57] ABSTRACT

A bearing assembly operatively interposed between a shaft and a housing having said shaft axially movably mounted therein for torque transmission therebetween includes a ball bushing inserted into a bushing receiving bore in the housing and guided through ball rings in ball races, with at least one of said ball rings being a load-transmitting ring including a load-transmitting ball ring section which rests radially inwardly against the shaft and radially outwardly against an external support surface defined by the ball bushing. The load bearing ball ring section of the at least one ball ring engages a race groove in the shaft on the shaft side of the ball ring and it engages a race groove of a bearing plate mounted in the ball bushing on the ball bushing side of the ball ring in a manner to transmit torque therebetween. The bearing plate may be pressed radially inwardly by means of a clamping device which presses against the ball bushing through contact surfaces which are oriented to intersect resultant planes generated by torque transmitting forces transmitted through the torque transmitting ball ring which are parallel to the bushing axis at an angle to insure a self-locking action.

13 Claims, 6 Drawing Figures

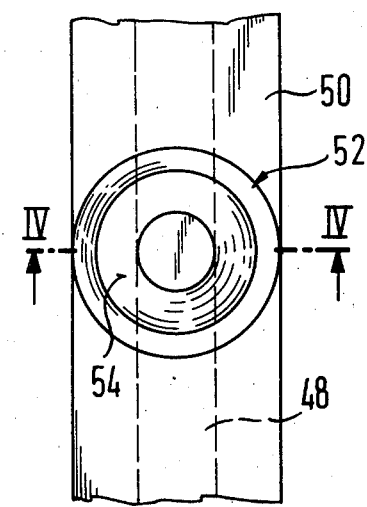
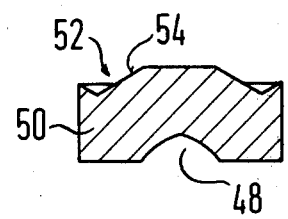
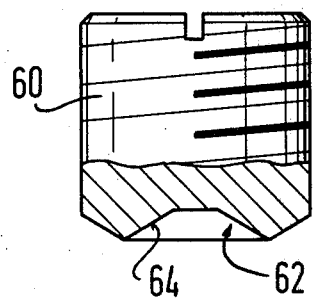
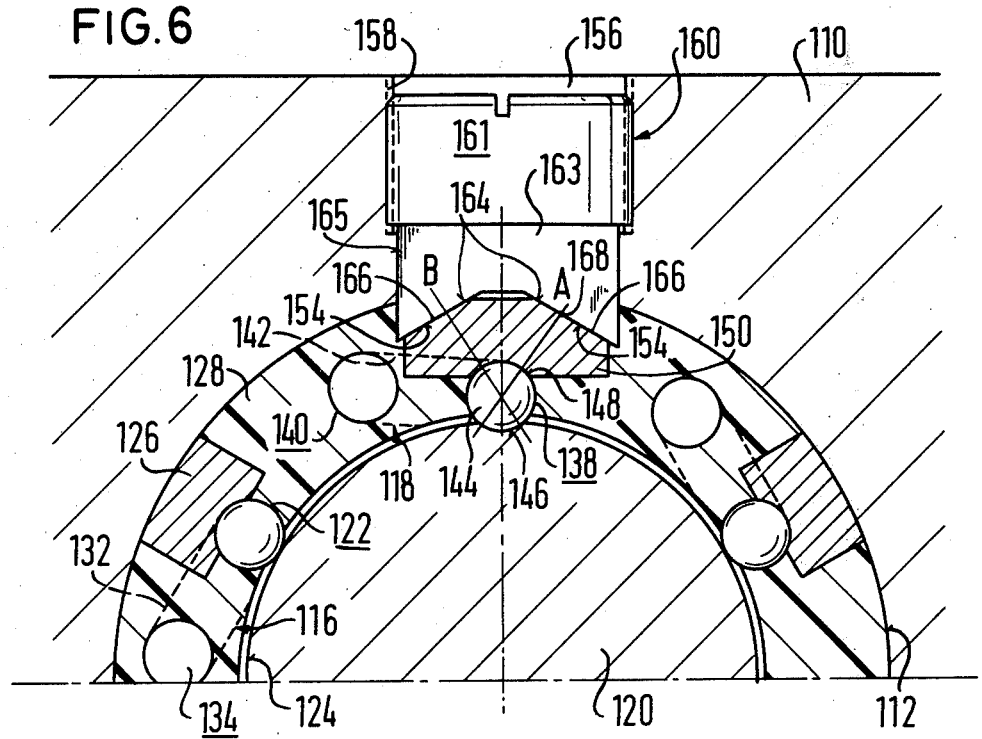

TORQUE TRANSMITTING BEARING ASSEMBLY

This is a continuation of application Ser. No. 088,822, filed Oct. 26, 1979 abandoned.

BACKGROUND OF THE INVENTION

The present invention relates generally to bearing assemblies and more particularly to a bearing assembly which is interposed between a shaft and a housing having the shaft axially movably received therein. The invention basically relates to a bearing assembly which includes a ball bushing inserted in a bushing receiving bore of the housing and guided through ball rings in ball races. At least one of the ball rings is arranged in torque transmitting engagement between the shaft and the ball bushing and a bearing plate is pressed against the ball ring section of the toreque transmitting ball ring by clamping means.

Bearings of the type discussed above are known from a brochure distributed by Thomson Industries Incorporated from 1975 having the title "Thomson Ball-Groove Shaft and Super Ball Bushing".

In a known arrangement of this type, a clamping device which is essentially formed by a threaded bolt which is screwed into the clamping bore engages a conical groove at the outer side of the bearing plate through a radially inner, central truncated cone-shaped projection whose diameter is reduced relative to the bolt diameter. It has been found that in this design tilting of the bearing plate about a tilting axis which is parallel to the bushing axis cannot be completely eliminated in the region of the contact surfaces between the clamping bolt and the bearing plate. This is particularly true when high torque is transmitted and when the bushing is manufactured from resilient material such as, for example, plastic material. Thus, the bearing plate may be caused to move relative to the plastic construction of the bushing. This causes an angular resilience to exist in the case of a torque loading which results in a negative influence upon the guidance accuracy of the assembly.

The present invention is directed toward the task of insuring that torque stiffness of the bearing and, accordingly, guidance accuracy thereof will be improved in a simple manner and with uncomplicated means, particularly without utilization of higher quality materials for the production of the ball bushing and for bearing plates, and without requiring increase in the manufacturing precision of the parts.

SUMMARY OF THE INVENTION

The present invention may be described as a bearing assembly for transmitting torque between a shaft and a housing having the shaft axially movably mounted therein. A ball bushing interposed between the shaft and the housing is received within a bushing-receiving bore formed in the housing. Ball rings are guided within the ball races of the ball bushing, and the ball rings include at least one ball ring having a load bearing ball ring section which is supported radially inwardly against the shaft and radially outwardly against the ball bushing for transmitting torque therebetween. A race groove formed in the shaft has one side of the load bearing ball ring section of the load-bearing ball ring engaged therein in a torque transmitting manner. Furthermore, a bearing plate mounted in the ball bushing and defining therein a race groove has the opposite side of the load bearing ball ring section engaged therein in a torque transmitting manner. Radial clamping means are provided for applying to the bearing plate a radially inwardly directed clamping force pressing the bearing plate against said opposite side of the load-bearing ball ring section. The invention provides means defining generally complementary contact surface means through which the radially clamping means abut against the bearing plate, said contact surface means being oriented to intersect resultant planes generated by torque transmitting forces transmitted through the torque transmitting ball ring which are parallel to the bushing axis at an angle to insure a self-locking action.

Thus, the invention solves the problems discussed above in that the radial clamping device rests against the bearing plate along contact surfaces which intersect a resultant plane which is parallel to the bushing axis, and which is generated by the torque transmitting forces transmitted through the torque transmitting ball ring section, at an angle insuring self-locking action in this contact surface.

It has been found as theoretically demonstrable that, when the principles of the invention are followed, tilting of the bearing plate no longer occurs even when high torque is transmitted. Therefore, torque stiffness of the bearing assembly and guidance accuracy of the assembly are significantly improved. The self-locking action in the contact surfaces is insured when the resultant plane intersects the contact surface at an angle which deviates from 90° by a value no more than the angle of friction of the parts which bear against each other in the contact surface.

As a rule, a torque transmitting axially movable bearing will be designed in such a way that it is capable of transmitting torque in both directions of rotation. If this requirement exists, it is advisable to arrange the contact surfaces symmetrical relative to a plane of symmetry which contains the bushing axis and which extends through the ball centers of the torque transmitting ball section. Furthermore, it is preferable to arrange the resultant planes of the torque transmitting forces for the two directions of torque transmission symmetrically relative to the plane of symmetry defined in the manner set forth above. The location of the resultant planes can be influenced by the shapes of the cross sections of the race grooves in the shaft and in the bearing plate.

In accordance with the first embodiment of the invention, the contact surface on the side of the bearing plate is designed with a convex conical shape or as a truncated conical surface which is axis-parallel with the clamping bore axis, and the contact surface on the side of the clamping device is designed with an essentially complementary conical or truncated conical surface. In this structural embodiment, the requirements of the invention are fulfilled in an intersecting plane which is perpendicular relative to the ball bushing axis and which contains the axis of the clamping bore. The concave, conical or frustoconical surface may be provided on the radially inner end of a threaded bolt which is screwed into a thread of the clamping bore so that, altogether, only one threaded bolt immediately acting on the bearing plate is required as the clamping device.

Of course, a plurality of clamping bores arranged adjacent each other in the axial direction of the ball bushing may be applied to each individual bearing plate.

In accordance with a further embodiment of the invention, the contact surface on the side of the bearing plate is formed by a convex sequence of prismatic surfaces which are parallel to the bushing axis, while the contact surface on the side of the clamping device is formed by bushing-parallel prismatic surfaces which are arranged in a concave sequence on a thrust member which is guided in the clamping bore. Contrary to the embodiment previously discussed, an immediate contact of a rotating part of the clamping device against the bearing plate is no longer possible in this other embodiment so that the use of a thrust member between the bearing plate rotating part of the clamping device becomes necessary. This thrust member may itself be constructed cylindrically and be received essentially without play in a corresponding, radially inner section of the clamping bore wherein, in this case, a threaded bolt which is seated in an internal thread of a radially outer portion of the clamping bore presses against a radially outer surface of the thrust member. The thrust member need not be centered in the clamping bore in the angular direction but it will center itself through contact with the bearing plate.

It should be emphasized that, in both of the embodiments mentioned above, it is not necessary to finish the inner surface of the bushing receiving bore of the housing for effecting torque support between the shaft and the housing since all parts of the torque support, insofar as they are not located within the bushing receiving bore, are accommodated within the clamping bore. The solution according to the present invention is of special importance when ball bushings are provided with a cage made of a relatively resilient material, particularly plastic. In such a case the cage defines the ball races and receives the bearing plate. If in this case the bearing plates are made of hard material such as, for example, steel there results in the solution of the present invention a torque transmission from the shaft to the housing which is free of play despite the resilience of the cage.

Of course, the invention may be utilized with best results when the resultant planes are exactly defined. In order to obtain an exact location of the resultant planes, it is proposed in a further development of the invention that the race grooves of the shaft and/or of the bearing plate be constructed in cross section with a pointed arc shape having partial arc radii which are larger than the radius of the balls of the bearing assembly. Thus, the contact tracks of the balls with the races and, therefore, the positions of the resultant planes will be clearly determined. Preferably, these resultant planes are arranged at an angle of between 20° and 50°, and preferably at an angle of between 30° and 45°, relative to the plane of symmetry previously defined.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is a top view showing the radially outer side of a bearing plate;

FIG. 4 is a sectional view of the bearing plate taken along the line IV—IV of FIG. 3;

FIG. 5 is a partially sectional view showing the radially inner end of the threaded bore of a radial clamping device; and FIG. 6 is a sectional view showing a modified embodiment of the invention.

DETAILED DESCRIPTION OF PREFERRED EMBODIMENTS

Figure 1:
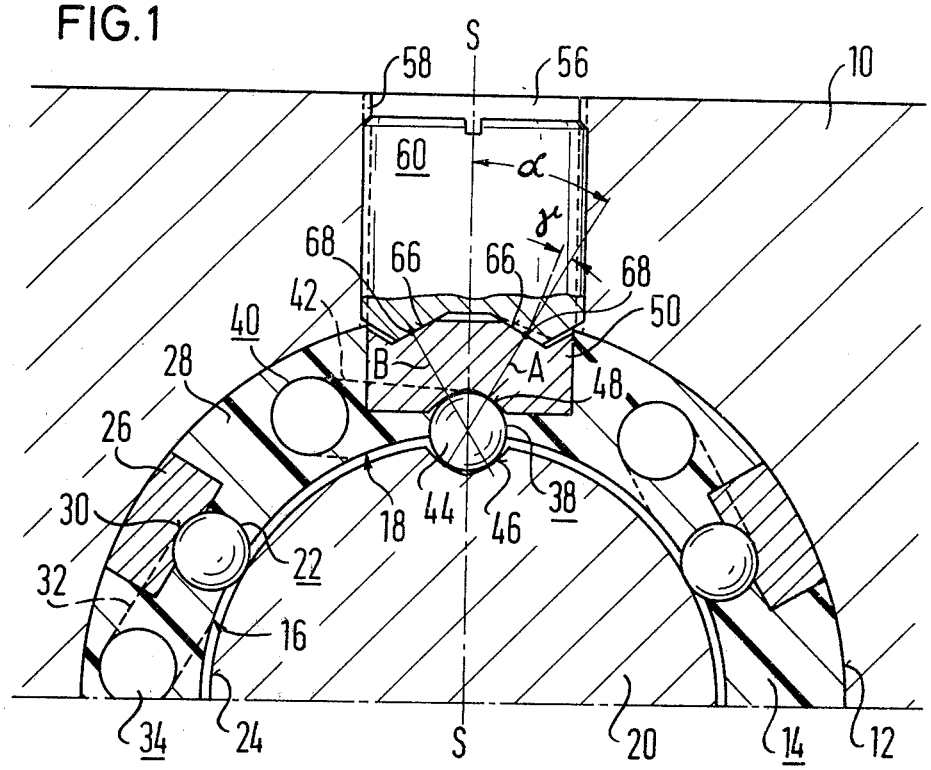
FIG. 1 is a sectional view taken through a bearing assembly in accordance with the present invention.

Referring now to FIG. 1, wherein there is shown a preferred embodiment of the invention, a ball assembly is depicted as including a housing 10 having a bushing receiving bore 12 therein with a ball bushing 14 being inserted within the bore 12.

The ball bushing 14 includes a plurality of ball races within which ball rings are inserted. The bushing 14 includes a first ball ring 16 and a second ball ring 18. The first ball ring 16 serves merely to transmit radial loads between a shaft 20 and the housing 10. The ball ring section which transmits the radial load is designated by the reference numeral 22. This ball ring section 22 bears against the cylindrical circumferential surface 24 of the shaft 20, on the one hand, and against a steel bearing plate 26 which is inserted into a ball bushing cage 28 made of plastic material, on the other hand. The ball ring 16 is provided with a race groove 30 for guiding the ball ring section 22. In the cage 28, a ball race denoted by reference numeral 32 and illustrated in dotted line is shown. The non-load bearing return travel section of the ball ring 16 is designated by reference numeral 34.

In the following description, there will be considered the ball ring 18 which, in addition to providing the function of absorbing radial forces, also provides the function of transmitting torque between the shaft 20 and the housing 10. The ball ring 18 comprises a torque-transmitting ball ring section 38 and a return travel section 40. The ball race is designated with the reference numeral 42. The ball which is exactly located at the intersecting plane in FIG. 1 is denoted with reference numeral 44. Balls 44 travel in an axis-parallel race groove 46 of the shaft 20 and also in an axis-parallel race groove 48 in the steel bearing plate 50. The steel bearing plate 50 differs from the bearing plate 26 in a manner which will be described in detail hereinafter.

As will be seen from FIGS. 1, 3 and 4, a contact surface generally designated by reference numeral 52 is formed on the rear side of the steel bearing plate 50. The contact surface 52 is formed in an essentially frustoconical configuration and comprises a convex truncated conical surface 54. In the housing 10 there is provided a clamping bore 56 which is radially bored relative to the bushing receiving bore 12 and which is provided with an internal thread 58. A threaded bolt 60 is threadedly engaged into the internal thread 58. As will be seen particularly from FIG. 5, the threaded bolt 60 has at its radially inner end a contact surface 62 which is provided with a concave frustoconical surface 64 which is complementary to the frustoconical surface 54 of the bearing plate 50. The convex frustoconical surface 54 and the concave frustoconical surface 64 of the bearing plate 50 and the threaded bolt 60 form together contact surface means denoted by reference numeral 66 in FIG. 1 located between the clamping means or threaded bolt 60 and the bearing plate 50.

Figure 2:
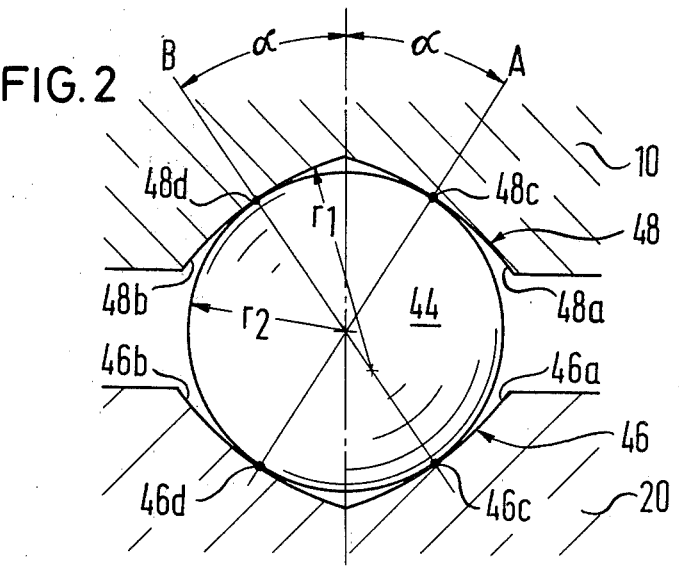
FIG. 2 is a schematic sectional view illustrating the engagement of a ball in a race groove of a shaft and in the race groove of a steel insert.

In order to illustrate torque transmission between the shaft 20 and the housing 10 reference is made to FIG. 2 wherein the conditions of transmission are shown on an enlarged scale. As will be seen, the race groove 46 of the shaft 20 and the race groove 48 of the housing 10 are constructed in the shape of a pointed arc wherein a radius $r_1$ of partial arcs 46a, 46b, 48a, 48b is larger than the ball radius $r_2$.

The points of contact between the ball 44 and the partial arcs 46a, 46b and 48a, 48b of the race grooves 46 and 48 are denoted by reference characters 46c, 46d and 48c, 48d, respectively. In the sectional view of FIG. 2, the contact points are shown to simultaneously represent the races upon which the balls 44 will roll during travel in the race grooves 46, 48. As a result of the point contact described between the balls 44 and the pointed arc-shaped race grooves 46, 48, the direction of the torque transmitting forces whereby torque is transmitted from the shaft 20 to the housing 10, or vice versa, may be determined. In FIG. 2, this direction is denoted by A and B. The lines A and B shown in FIG. 2 also represent the resultant planes wherein, as viewed over the entire length of the bearing, torque transmitting forces are transmitted between the shaft 20 and the housing 10. These planes are referred to as resultant planes. However, resultant planes would also exist when the balls 44 do not rest against the race grooves 46a and 48a in a point contact as illustrated in FIG. 2, but when they are adapted to the latter over a wider arc; in this case, for each ball a resultant torque-transmitting force would have to be defined and the sum of these resultant forces would once again define the resultant planes A and B.

Referring now again to FIG. 1, the resultant planes A and B may be seen in this figure. It will seen that, in the sectional representation of FIG. 1, the resultant planes A and B intersect the frustoconical surface 54 approximately perpendicularly; that is in the region of the contact surface means 66. This indicates that the torque transmitting forces transmitted in the resultant planes A and B cannot cause or create a tilting or shifting action of the bearing plate 50 relative to the threaded bolt 60 which acts as the clamping means of the invention. In order to eliminate the possibility of shifting of the parts, it is necessary that the bearing plate rest against the threaded bolt 60 at the point 68 in a self-locking manner. A self-locking contact is always present when the resultant plane A is perpendicular to the contact surface means 66. However, this surface-locking contact also exists when the inclination of the resultant planes A or B deviates from the contact surface means 66, as illustrated in FIG. 1 in dotted line form, by an angle less than the angle $\gamma$ which is defined as the angle of friction and which is calculated as a function of the friction coefficient existing between the contact surfaces 54 and 64 in accordance with the following formula $$\gamma = \arctan \mu$$

wherein $\mu$ is the friction coefficient.

In FIG. 1, there is shown a plane of symmetry which is denoted S—S and which contains the axis of the threaded bolt 60 and which also extends through the center of the ball 44. The resultant planes A, B are inclined relative to this plane of symmetry by an angle $\alpha$ of about 30°.

The embodiment in accordance with FIG. 6 differs from the embodiment according to FIG. 1 only with regard to a difference in design of the clamping means and of the contact between the clamping means and the bearing plate. Analogous parts in FIG. 6 are denoted by reference numerals similar to those previously utilized but increased by a factor of 100.

In the embodiment of FIG. 6, the clamping means 160 comprises a threaded bolt 161 which is screwed into an internal thread 158, with a thrust member 163 resting against a radially inner plane surface of the threaded bolt 161. Prismatic surfaces 164 are formed on the thrust member 163, with these prismatic surfaces 164 resting against prismatic surfaces 154 of the bearing plate 150. The prismatic surfaces of the bearing plate may extend over the length of the ball bushing and the prismatic surfaces 164 of the thrust member 163 are limited to the dimensions of the cylindrical thrust member 163. The thrust member 163 is received essentially without play in a radially inner section 165 of the bore 156.

With reference to torque support force transmission without tilting and sliding, the same considerations apply to the embodiment of FIG. 6 as were applied in connection with the embodiment of FIG. 1. The embodiment according to FIG. 6 is somewhat more complicated insofar as it requires a two-part clamping means consisting of the threaded bolt 161 and the thrust member 163 with a step bore. However, this embodiment should provide advantageous results especially when a plurality of clamping devices 160 are provided adjacent each other in the longitudinal direction of the bushing assembly because these devices may then act upon the same prismatic surfaces 154 of the bearing plate 150.

While specific embodiments of the invention have been shown and described in detail to illustrate the application of the inventive principles, it will be understood that the invention may be embodied otherwise without departing from such principles.

What is claimed is:

1. A bearing assembly for transmitting torque between a shaft and a housing having said shaft axially movably mounted therein comprising: a ball bushing interposed between said shaft and said housing, said ball bushing having a bushing axis and being received within a bushing receiving bore formed in said housing; ball rings guided within ball races of said ball bushing, said ball rings including at least one ball ring having a load-bearing ball ring section supported radially inwardly against said shaft and radially outwardly against said ball bushing for transmitting torque therebetween; a race groove formed in said shaft having one side of said load-bearing ball ring section of said at least one ball ring engaged therein in a torque transmitting manner; a bearing plate mounted in said ball bushing and defining therein a race groove having the side opposite said one side of said load-bearing ball ring section engaged therein in a torque transmitting manner; radial clamping means for applying to said bearing plate a radially inwardly directed clamping force pressing said bearing plate against said opposite side of said load-bearing ball ring section; and means defining generally complementary contact surface means through which said radial clamping means abuts against said bearing plate, said contact surface means being oriented to intersect resultant planes generated by torque transmitting forces transmitted through said torque transmitting ball ring which are parallel to said bushing axis at an angle to insure a self-locking action.

2. A bearing assembly according to claim 1 wherein said assembly includes a pair of said resultant planes intersecting said contact surface means at an angle which deviates from 90° not more than the value of an angle of friction λ which is defined in terms of the frictional coefficient between a contact surface on said clamping means and an engaging contact surface on said bearing plate which together define at least a part of said contact surface means in accordance with the formula $$\lambda = \text{arc tan } \mu$$

wherein $\mu$ is said friction coefficient.

3. A bearing assembly according to claim 2 wherein said contact surface means is formed to extend symmetrically relative to a plane of symmetry of said bearing assembly which contains said bushing axis and which extends through the centers of the balls of said torque-transmitting ball ring section, with said pair of resultant planes generated by said torque transmitting forces for two directions of torque transmission being symmetrical relative to said plane of symmetry.

4. An assembly according to claim 3 wherein said resultant planes form an angle of between 20° and 50° relative to said plane of symmetry.

5. A bearing assembly according to claim 4 wherein said resultant planes form an angle of between 30° and 45° relative to said plane of symmetry.

6. A bearing assembly according to claims 2 or 3 wherein said contact surface on said bearing plate comprises a convex frustoconical surface which is axis-parallel with the axis of a clamping bore in said housing within which said radial clamping means are engaged and that said contact surface on said clamping means comprises an essentially complementary concave frustoconical surface.

7. A bearing assembly according to claim 6 wherein said radial clamping means comprise a threaded bolt which is threadedly engaged into a clamping bore formed through said housing and wherein said concave frustoconical surface of said radial clamping means is arranged at said radially inner end of said threaded bolt.

8. A bearing assembly according to claim 1 wherein said contact surface means comprise a contact surface formed on said bearing plate comprising a convex sequence of prismatic surfaces which are parallel to said bushing axis and a contact surface on the radially clamping means which comprises a thrust member guided in a clamping bore formed in said housing formed as a concave sequence of prismatic surfaces which are also parallel to said bushing axis.

9. A bearing assembly according to claim 8 wherein said thrust member is constructed with a cylindrical configuration and is received essentially without play in a corresponding radially inner section of said clamping bore and wherein a threaded bolt seated in an internal thread of the radially outer section of said clamping bore presses against a radially outer surface of said thrust member.

10. A bearing assembly according to claim 1 wherein said ball bushing comprises a cage formed of resilient material defining said ball races and receiving said bearing plate, said bearing plate being made of harder material than said ball bushing.

11. An assembly according to claim 10 wherein said cage consists of plastic material.

12. A bearing assembly according to claim 11 wherein said bearing plates are formed of steel.

13. A bearing assembly according to claim 1 wherein said race grooves in said shaft and in said bearing plate are constructed with cross-sectional configurations in the shape of a pointed arc, each of said arcs formed of arc sections having a partial arc radius which is larger than the radius of the balls of said ball races, with said bearing assembly being arranged such that contact engagement between said balls and said races and the positions of said resultant planes are clearly defined.

* * * * *